US007954714B2

(12) United States Patent
Anderson et al.

(10) Patent No.: US 7,954,714 B2
(45) Date of Patent: Jun. 7, 2011

(54) INLINE COATINGS PROCESS FOR XEROGRAPHICALLY PREPARED MICR CHECKS

(75) Inventors: Christine Anderson, Hamilton (CA); Alexander Vakov, Etobicoke (CA); T Brian McAneney, Burlington (CA); Kurt I. Halfyard, Mississauga (CA); Santokh S. Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 327 days.

(21) Appl. No.: 11/523,285

(22) Filed: Sep. 18, 2006

(65) Prior Publication Data

US 2008/0069613 A1 Mar. 20, 2008

(51) Int. Cl.
*G06K 7/08* (2006.01)

(52) U.S. Cl. ........................................ 235/449; 399/341

(58) Field of Classification Search .................. 235/449; 399/341, 347

See application file for complete search history.

(56) References Cited

U.S. PATENT DOCUMENTS

| | | | | | |
|---|---|---|---|---|---|
| 4,181,766 | A | * | 1/1980 | Williams et al. | 428/216 |
| 4,231,593 | A | | 11/1980 | Bell, Jr. et al. | |
| 4,533,596 | A | * | 8/1985 | Besselman | 428/844.5 |
| 4,746,542 | A | * | 5/1988 | Chino et al. | 427/131 |
| 4,901,114 | A | * | 2/1990 | Parker et al. | 399/232 |
| 4,908,240 | A | * | 3/1990 | Auhorn et al. | 427/391 |
| 5,342,877 | A | * | 8/1994 | Clark | 524/513 |
| 5,729,813 | A | * | 3/1998 | Eddy et al. | 399/333 |
| 5,843,579 | A | * | 12/1998 | Roth et al. | 428/32.84 |
| 6,060,167 | A | * | 5/2000 | Morgan et al. | 428/422 |
| 6,068,957 | A | * | 5/2000 | Nair et al. | 430/66 |
| 6,899,944 | B2 | * | 5/2005 | Tanaka et al. | 428/195.1 |
| 7,262,150 | B2 | * | 8/2007 | Kalishek et al. | 503/201 |
| 2002/0006559 | A1 | * | 1/2002 | Mehta et al. | 430/11 |
| 2003/0211299 | A1 | * | 11/2003 | Rajan et al. | 428/195.1 |
| 2004/0028436 | A1 | | 2/2004 | Suzuki et al. | |
| 2005/0250039 | A1 | | 11/2005 | Halfyard et al. | |

FOREIGN PATENT DOCUMENTS

WO 0184247 11/2001

OTHER PUBLICATIONS

European Patent Office; European Search Report; European Patent Application No. 07116439.6, Oct. 19, 2009, 3 Pages.

* cited by examiner

*Primary Examiner* — Daniel A Hess
*Assistant Examiner* — Rafferty Kelly
(74) *Attorney, Agent, or Firm* — MH2 Technology Law Group LLP

(57) ABSTRACT

A process of MICR and non-MICR electrostatic magnetic imaging of two independent electrostatic latent images including (a) forming a first electrostatic latent image in a MICR printing apparatus; (b) developing the first electrostatic latent image by contacting the first electrostatic latent image with a MICR toner to produce a developed MICR toner image; (c) transferring the developed MICR toner image onto a check; (d) forming a second electrostatic latent image in a non-MICR printing apparatus; (e) developing the second electrostatic latent image by contacting the second electrostatic latent image with a non-MICR toner to produce a developed non-MICR image; (f) transferring the developed non-MICR toner image to the check; (g) fusing the MICR toner image and the non-MICR toner image to the check, wherein a fuser oil is supplied to the check during fusing; (h) coating the check having fused developed MICR toner image and non-MICR toner image with an aqueous coating comprising a polymer and a surfactant.

22 Claims, No Drawings

INLINE COATINGS PROCESS FOR XEROGRAPHICALLY PREPARED MICR CHECKS

BACKGROUND

Herein are described processes and formulations for coating checks to be used in many applications including printing, for example, electrophotographic, ionographic or magnetographic prints, such as in xerographic printers and copiers, especially MICR (magnetic ink character recognition) and related processes, including digital systems.

Demand for color and personalization of checks has been growing. Some current xerographic machines used to print checks have limitations, including the inability to use MICR toner, and also residual fuser oil present on the fused checks. Residual fuser oil (for example, amino-based fuser oils) on the checks leads to problems with secondary MICR imprinting (when the amount field is subsequently imprinted on the check at a bank, for example). It is believed that the residual fuser oil on the checks leads to a decrease in ink receptivity, which, in turn, results in poor secondary MICR imprinting. This leads to a reader reject rate of approximately 30% or more. Current solutions to the problems include manual cleaning of the checks with organic solvents.

U.S. Pat. No. 4,231,593 discloses a check with first and second coatings, one of which is electrically conductive, and the other which is electrically non-conductive.

It is desired to provide a process for allowing successful secondary MICR imprinting of checks, after the initial MICR/color fusing. Herein is disclosed processes and coatings for MICR color printed checks, wherein the coating is applied later, for example, from about 50 milliseconds to about 120 seconds after the final fusing process (but in embodiments, before the secondary encoding), using an inline coater. The coating, in effect, seals in the fuser oil, and therefore, leaves a surface on which further MICR imprinting can be successfully achieved. In embodiments, the secondary MICR imprinting can be carried out with a reader rejection rate, which is, in embodiments, greatly improved over uncoated, oil-covered checks.

SUMMARY

Embodiments include a process of MICR and non-MICR electrostatic magnetic imaging of two independent electrostatic latent images comprising (a) forming a first electrostatic latent image in a MICR printing apparatus; (b) developing the first electrostatic latent image by contacting the first electrostatic latent image with a MICR toner to produce a developed MICR toner image; (c) transferring the developed MICR toner image onto a check; (d) forming a second electrostatic latent image in a non-MICR printing apparatus; (e) developing the second electrostatic latent image by contacting the second electrostatic latent image with a non-MICR toner to produce a developed non-MICR image; (f) transferring the developed non-MICR toner image to the check; (g) fusing the MICR toner image and the non-MICR toner image to the check, wherein a fuser oil is supplied to the check during fusing; (h) coating the check having fused developed MICR toner image and non-MICR toner image with an aqueous coating comprising a polymer and a surfactant.

Embodiments also include a process of MICR and non-MICR electrostatic magnetic imaging of two independent electrostatic latent images comprising (a) forming a first electrostatic latent image in a MICR printing apparatus; (b) developing the first electrostatic latent image by contacting the first electrostatic latent image with a MICR toner to produce a developed MICR toner image; (c) transferring the developed MICR toner image onto a check; (d) forming a second electrostatic latent image in a non-MICR printing apparatus; (e) developing the second electrostatic latent image by contacting the second electrostatic latent image with a non-MICR toner to produce a developed non-MICR image; (f) transferring the developed non-MICR toner image to the check; (g) fusing the MICR toner image and the non-MICR toner image to the check, wherein a fuser oil is supplied to the check during fusing, and wherein the fuser oil is selected from the group consisting of amino functional fuser oil and mercapto functional fuser oil; (h) coating the check having fused developed MICR toner image and non-MICR toner image with an aqueous coating comprising a polymer and a surfactant.

In addition, embodiments include a process of MICR and non-MICR electrostatic magnetic imaging of two independent electrostatic latent images comprising (a) forming a first electrostatic latent image in a MICR printing apparatus; (b) developing the first electrostatic latent image by contacting the first electrostatic latent image with a MICR toner to produce a developed MICR toner image; (c) transferring the developed MICR toner image onto a check; (d) forming a second electrostatic latent image in a non-MICR printing apparatus; (e) developing the second electrostatic latent image by contacting the second electrostatic latent image with a non-MICR toner to produce a developed non-MICR image; (f) transferring the developed non-MICR toner image to the check; (g) fusing the MICR toner image and the non-MICR toner image to the check, wherein a fuser oil is supplied to the check during fusing; (h) coating the check having fused developed MICR toner image and non-MICR toner image with an aqueous coating comprising an acrylic polymer blend, a surfactant, a viscosity modifier, a wax, an optional defoamer, and a neutralizing agent.

DETAILED DESCRIPTION

Herein are described electrostatic processes for generating documents suitable for magnetic image character recognition (MICR) involving the use of magnetic toner compositions. In embodiments, documents such as checks and personal checks can be prepared and printed. Herein are described coating formulations and processes for coating checks, which allow for personalization of checks following initial MICR imaging of the check while mitigating the negative effects of fuser oil, thereby increasing reader reliability, by the application of an aqueous coating.

Xerox DocuTech® and other machines can be used to print checks, and in embodiments, MICR encoding checks. The process allows for basic check writing abilities, but does not provide the flexibility to use color or allow for personalization of checks. In some machines, such as the DocuTech® family of machines, the background and initial MICR encoding is all performed on one machine. Fuser oils such as mercapto and other functional fuser oils are used in such machines. The fuser oils are used to strip the sheets from the fuser members. Further, secondary MICR encoding is performed at the "bank of first deposit" where the MICR imprinting is placed over the fused check. When the completed check is placed through the check reader/sorter, the passable read rate must be at or below 0.5%.

With processes incorporating full color printing and MICR capabilities, the major problem which arises is the fact that the read rate of the checks printed on such machines is around a 30% failure rate. This is thought to be due to the difference in fuser oil employed in known color machines. For example, amino functional oil is used as opposed to mercapto functional oil. This amino functional oil interferes with ink receptivity, and therefore, secondary MICR imprinting, thus leading to the high rejection rates. In order to provide full color printing and MICR capabilities, it is desired to develop a process to correct the oil problem.

Commercial aqueous coatings are generally used to increase image robustness and aesthetic value to fused prints (packaging, mailers, etc) at a minimal cost to the printer. However, these commercial coatings are generally used over prints made with ink on conventional offset presses and unfortunately, the most commonly used neutralizing agent in these coatings is ammonia (which is know to be detrimental to xerographic photoreceptors). Another problem with commercial coatings is that the surface tension is generally high enough that it causes surface energy issues when used in conjunction with xerographic prints, which are coated with fuser oil (which have inherently low surface tension). Therefore, these two issues eliminate the use of most commercial coatings with xerographic machines. However, coating formulations herein overcome these two issues, in embodiments. These aqueous coatings can be used on both coated and uncoated paper on a fairly wide range of paper stock. A coating is placed on the fused toner image and paper, and forms a continuous dry film layer, thereby sealing in the fuser oil.

Typical fuser oils that can be used include non-functional and functional fuser oils, such as functional amino, functional mercapto, and the like fuser oils. The oil rate per copy ranges from about 1 to about 20 microliters per copy.

The process may be used with a monochrome xerographic printer, and in particular, a high-speed xerographic printer, using MICR toner, followed by a high speed xerographic printing machine using non-MICR toner. The MICR toner is black, in embodiments, and the non-MICR xerographic toner can be black or color, and in embodiments, is color. The xerographic MICR printer and non-MICR xerographic print engine may be separate machines, which work together.

In embodiments, a first toner (a MICR toner) is used to develop an initial latent image on a check in a MICR printing apparatus. The first toner can comprise a resin, wax, colorant, and optional additives.

The MICR toner compositions selected herein may comprise resin particles, magnetites, and optional colorant, such as pigment, dyes, carbon blacks, and waxes such as polyethylene and polypropylene. The toners can further include a second resin, a colorant or colorants, a charge additive, a flow additive, reuse or recycled toner fines, and other ingredients. Also there can be blended at least one surface additive with the ground and classified melt mixed toner product. Toner particles in embodiments can have a volume average diameter particle size of about 6 to about 25, or from about 6 to about 14 microns.

Resin

Illustrative examples of resins suitable for MICR toner and MICR developer compositions herein include linear or branched styrene acrylates, styrene methacrylates, styrene butadienes, vinyl resins, including linear or branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. A specific example includes styrene butadiene copolymers, mixtures thereof, and the like, and also styrene/n-butyl acrylate copolymers, PLIOLITES®; suspension polymerized styrene butadienes, reference U.S. Pat. No. 4,558,108, the disclosure of which is totally incorporated herein by reference.

Magnetite

Various forms of iron oxide can be used as the magnetite. Magnetites can include a mixture of iron oxides (for example, $FeO.Fe_2O_3$) and carbon black, including those commercially available as MAPICO BLACK®. Mixtures of magnetites can be present in the toner composition in an amount of from about 10 to about 70 percent by weight, or from about 10 percent by weight to about 50 percent by weight. Mixtures of carbon black and magnetite with from about 1 to about 15 weight percent of carbon black, or from about 2 to about 6 weight percent of carbon black, and magnetite, in an amount of, for example, from about 5 to about 60, or from about 10 to about 50 weight percent, can be selected.

Optional Colorant

Colorant includes pigments, dyes, mixtures thereof, mixtures of pigments, mixtures of dyes, and the like.

Wax

Illustrative examples of aliphatic hydrocarbon waxes include low molecular weight polyethylene and polypropylene waxes with a weight average molecular weight of, for example, about 500 to about 5,000. Also, there are included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes used for the toner compositions are believed to have a molecular weight of from about 4,000 to about 5,000. The wax can be present in the toner in an amount of from about 4 to about 7 weight percent.

Other Optional Additives

There can also be blended with the toner compositions external additive particles including flow aid additives, which additives are usually present on the surface of the toner particles. Examples of these additives include metal oxides, such as titanium oxides, strontium oxides, strontium titanates, colloidal silicas, such as AEROSIL®, cerium oxides, aluminum oxides, metal salts and metal salts of fatty acids such as zinc stearate, and mixtures thereof. The additives are generally present in an amount of from about 0.1 to about 10 percent by weight, or from about 0.1 to about 5 percent by weight. Colloidal silicas, such as AEROSIL®, can be surface treated with the charge additives in an amount of from about 1 to about 30 weight percent, or from about 10 to about 20 weight percent followed by the addition thereof to the toner in an amount of from 0.1 to 10, or from about 0.1 to about 1 weight percent.

Optional Carrier

Illustrative examples of carrier particles include iron powder, steel, nickel, iron, ferrites, including copper zinc ferrites, and the like. The carrier can be coated with a coating such as terpolymers of styrene, methylmethacrylate, and a silane, such as triethoxy silane, including for example KYNAR® and polymethylmethacrylate mixtures (40/60). Coating weights can vary as indicated herein. However, the weights can be from about 0.3 to about 2, or from about 0.5 to about 1.5 weight percent coating weight.

The present process can be employed with either or both single component (SCD) and two-component development systems.

Suitable non-MICR toners are disclosed in, for example, U.S. Pat. Nos. 6,326,119; 6,365,316; 6,824,942 and 6,850,725, the disclosures thereof are hereby incorporated by reference in their entirety. In embodiments, the non-MICR toner can be black or color, and in embodiments, is color non-MICR xerographic toner.

Resin

The non-MICR toner resin can be a partially crosslinked unsaturated resin such as unsaturated polyester prepared by crosslinking a linear unsaturated resin (hereinafter called base resin), such as linear unsaturated polyester resin, in embodiments, with a chemical initiator, in a melt mixing device such as, for example, an extruder at high temperature (e.g., above the melting temperature of the resin, and more specifically, up to about 150° C. above that melting temperature) and under high shear. Also, the toner resin possesses, for example, a weight fraction of the microgel (gel content) in the resin mixture of from about 0.001 to about 50 weight percent, from about 1 to about 20 weight percent, or about 1 to about 10 weight percent, or from about 2 to about 9 weight percent. The linear portion is comprised of base resin, more specifically unsaturated polyester, in the range of from about 50 to about 99.999 percent by weight of the toner resin, or from about 80 to about 98 percent by weight of the toner resin. The linear portion of the resin may comprise low molecular weight reactive base resin that did not crosslink during the crosslinking reaction, more specifically unsaturated polyester resin.

The molecular weight distribution of the resin is thus bimodal having different ranges for the linear and the crosslinked portions of the binder. The number average molecular weight ($M_n$) of the linear portion as measured by gel permeation chromatography (GPC) is from, for example, about 1,000 to about 20,000, or from about 3,000 to about 8,000. The weight average molecular weight ($M_w$) of the linear portion is from, for example, about 2,000 to about 40,000, or from about 5,000 to about 20,000. The weight average molecular weight of the gel portions is greater than 1,000,000. The molecular weight distribution ($M_w/M_n$) of the linear portion is from about 1.5 to about 6, or from about 1.8 to about 4. The onset glass transition temperature (Tg) of the linear portion as measured by differential scanning calorimetry (DSC) is from about 50° C. to about 70° C.

Moreover, the binder resin, especially the crosslinked polyesters, can provide a low melt toner with a minimum fix temperature of from about 100° C. to about 200° C., or from about 100° C. to about 160° C., or from about 110° C. to about 140° C.; provide the low melt toner with a wide fusing latitude to minimize or prevent offset of the toner onto the fuser roll; and maintain high toner pulverization efficiencies. The toner resins and thus toners, show minimized or substantially no vinyl or document offset.

Examples of unsaturated polyester base resins are prepared from diacids and/or anhydrides such as, for example, maleic anhydride, fumaric acid, and the like, and mixtures thereof, and diols such as, for example, propoxylated bisphenol A, propylene glycol, and the like, and mixtures thereof. An example of a suitable polyester is poly(propoxylated bisphenol A fumarate).

In embodiments, the toner binder resin is generated by the melt extrusion of (a) linear propoxylated bisphenol A fumarate resin, and (b) crosslinked by reactive extrusion of the linear resin with the resulting extrudate comprising a resin with an overall gel content of from about 2 to about 9 weight percent. Linear propoxylated bisphenol A fumarate resin is available under the trade name SPAR II™ from Resana S/A Industrias Quimicas, Sao Paulo Brazil, or as NEOXYL P2294™ or P2297™ from DSM Polymer, Geleen, The Netherlands, for example. For suitable toner storage and prevention of vinyl and document offset, the polyester resin blend more specifically has a Tg range of from, for example, about 52° C. to about 64° C.

Chemical initiators, such as, for example, organic peroxides or azo-compounds, can be used for the preparation of the crosslinked toner resins.

The low melt toners and toner resins may be prepared by a reactive melt mixing process wherein reactive resins are partially crosslinked. For example, low melt toner resins may be fabricated by a reactive melt mixing process comprising (1) melting reactive base resin, thereby forming a polymer melt, in a melt mixing device; (2) initiating crosslinking of the polymer melt, more specifically with a chemical crosslinking initiator and increased reaction temperature; (3) retaining the polymer melt in the melt mixing device for a sufficient residence time that partial crosslinking of the base resin may be achieved; (4) providing sufficiently high shear during the crosslinking reaction to keep the gel particles formed and broken down during shearing and mixing, and well distributed in the polymer melt; (5) optionally devolatilizing the polymer melt to remove any effluent volatiles; and (6) optionally adding additional linear base resin after the crosslinking in order to achieve the desired level of gel content in the end resin. The high temperature reactive melt mixing process allows for very fast crosslinking which enables the production of substantially only microgel particles, and the high shear of the process prevents undue growth of the microgels and enables the microgel particles to be uniformly distributed in the resin.

A reactive melt mixing process is, for example, a process wherein chemical reactions can be affected on the polymer in the melt phase in a melt-mixing device, such as an extruder. In preparing the toner resins, these reactions are used to modify the chemical structure and the molecular weight, and thus the melt rheology and fusing properties of the polymer. Reactive melt mixing is particularly efficient for highly viscous materials, and is advantageous because it requires no solvents, and thus is easily environmentally controlled. As the amount of crosslinking desired is achieved, the reaction products can be quickly removed from the reaction chamber.

The resin is present in the non-MICR toner in an amount of from about 40 to about 98 percent by weight, or from about 70 to about 98 percent by weight. The resin can be melt blended or mixed with a colorant, charge carrier additives, surfactants, emulsifiers, pigment dispersants, flow additives, embrittling agents, and the like. The resultant product can then be pulverized by known methods, such as milling, to form the desired toner particles.

Waxes

Waxes with, for example, a low molecular weight $M_w$ of from about 1,000 to about 10,000, such as polyethylene, polypropylene, and paraffin waxes, can be included in, or on the toner compositions as, for example, fusing release agents.

Colorants

Various suitable colorants of any color can be present in the non-MICR toners, including suitable colored pigments, dyes, and mixtures thereof including REGAL 330®; (Cabot), Acetylene Black, Lamp Black, Aniline Black; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like; cyan, magenta, yellow, red, green, brown, blue or mixtures thereof, such as specific phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments and dyes that can be selected are cyan, magenta, or yellow pigments or dyes, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Other colorants are magenta colorants of (Pigment Red) PR81:2, CI 45160:3. Illustrative examples of cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Forum Yellow SE/GLN, CI Dispersed Yellow 33 2,5-dimethoxy-4-sulfonanilide phenylazo-4'-chloro-2,5-dimethoxy acetoacetanilides, and Permanent Yellow FGL, PY17, CI 21105, and known suitable dyes, such as red, blue, green, Pigment Blue 15:3 C.I. 74160, Pigment Red 81:3 C.I. 45160:3, and Pigment Yellow 17 C.I. 21105, and the like, reference for example U.S. Pat. No. 5,556,727, the disclosure of which is totally incorporated herein by reference.

The colorant, more specifically black, cyan, magenta and/or yellow colorant, is incorporated in an amount sufficient to impart the desired color to the toner. In general, pigment or dye is selected, for example, in an amount of from about 2 to about 60 percent by weight, or from about 2 to about 9 percent by weight for color toner, and about 3 to about 60 percent by weight for black toner.

Additives

Any suitable surface additives may be selected. Examples of additives are surface treated fumed silicas, for example TS-530 from Cabosil Corporation, with an 8 nanometer particle size and a surface treatment of hexamethyldisilazane; NA50HS silica, obtained from DeGussa/Nippon Aerosil Corporation, coated with a mixture of HMDS and aminopropyltriethoxysilane; DTMS silica, obtained from Cabot Corporation, comprised of a fumed silica silicon dioxide core L90 coated with DTMS; H2050EP, obtained from Wacker Chemie, coated with an amino functionalized organopolysiloxane; metal oxides such as $TiO_2$, for example MT-3103 from Tayca Corp. with a 16 nanometer particle size and a surface treatment of decylsilane; SMT5103, obtained from Tayca Corporation, comprised of a crystalline titanium dioxide core MT500B coated with DTMS; P-25 from Degussa Chemicals with no surface treatment; alternate metal oxides such as aluminum oxide, and as a lubricating agent, for example, stearates or long chain alcohols, such as UNILIN 700™, and the like. In general, silica is applied to the toner surface for toner flow, tribo enhancement, admix control, improved development and transfer stability, and higher toner blocking temperature. $TiO_2$ is applied for improved relative humidity (RH) stability, tribo control and improved development and transfer stability.

The $SiO_2$ and $TiO_2$ should more specifically possess a primary particle size greater than approximately 30 nanometers, or at least 40 nanometers, with the primary particles size measured by, for instance, transmission electron microscopy (TEM) or calculated (assuming spherical particles) from a measurement of the gas absorption, or BET, surface area. $TiO_2$ is found to be especially helpful in maintaining development and transfer over a broad range of area coverage and job run length. The $SiO_2$ and $TiO_2$ are more specifically applied to the toner surface with the total coverage of the toner ranging from, for example, about 140 to about 200 percent theoretical surface area coverage (SAC), where the theoretical SAC (hereafter referred to as SAC) is calculated assuming all toner particles are spherical and have a diameter equal to the volume median diameter of the toner as measured in the standard Coulter Counter method, and that the additive particles are distributed as primary particles on the toner surface in a hexagonal closed packed structure. Another metric relating to the amount and size of the additives is the sum of the "SAC×Size" (surface area coverage times the primary particle size of the additive in nanometers) for each of the silica and titania particles, or the like, for which all of the additives should, more specifically, have a total SAC×Size range of, for example, about 4,500 to about 7,200. The ratio of the silica to titania particles is generally from about 50 percent silica/50 percent titania to about 85 percent silica/15 percent titania (on a weight percentage basis).

Examples of suitable $SiO_2$ and $TiO_2$ are those surface treated with compounds including DTMS (decyltrimethoxysilane) or HMDS (hexamethyldisilazane). Examples of these additives are NA50HS silica, obtained from DeGussa/Nippon Aerosil Corporation, coated with a mixture of HMDS and aminopropyltriethoxysilane; DTMS silica, obtained from Cabot Corporation, comprised of a fumed silica, for example silicon dioxide core L90 coated with DTMS; H2050EP, obtained from Wacker Chemie, coated with an amino functionalized organopolysiloxane; and SMT5103, obtained from Tayca Corporation, comprised of a crystalline titanium dioxide core MT500B, coated with DTMS.

Calcium stearate can be selected as an additive for the toners of the present invention in embodiments thereof, the calcium stearate primarily providing lubricating properties. Also, the calcium stearate can provide developer conductivity and tribo enhancement, both due to its lubricating nature. In addition, calcium stearate enables higher toner charge and charge stability by increasing the number of contacts between toner and carrier particles. A suitable example is a commercially available calcium stearate with greater than about 85 percent purity, for example from about 85 to about 100 percent pure, for the 85 percent (less than 12 percent calcium oxide and free fatty acid by weight, and less than 3 percent moisture content by weight) and which has an average particle diameter of about 7 microns and is available from Ferro Corporation (Cleveland, Ohio). Examples are SYNPRO® Calcium Stearate 392A and SYNPRO® Calcium Stearate NF Vegetable. Another example is a commercially available calcium stearate with greater than 95 percent purity (less than 0.5 percent calcium oxide and free fatty acid by weight, and less than 4.5 percent moisture content by weight), and which stearate has an average particle diameter of about 2 microns and is available from NOF Corporation (Tokyo, Japan). In embodiments, the toners contain from, for example, about 0.1 to about 5 weight percent titania, about 0.1 to about 8 weight percent silica, or from about 0.1 to about 4 weight percent calcium stearate.

The non-MICR toner composition can be prepared by a number of known methods including melt blending the toner resin particles, and pigment particles or colorants, followed by mechanical attrition. Other methods include those well known in the art such as spray drying, melt dispersion, dispersion polymerization, suspension polymerization, extrusion, and emulsion/aggregation processes.

The resulting non-MICR toner particles can then be formulated into a developer composition. The toner particles can be mixed with carrier particles to achieve a two-component developer composition.

In embodiments, a coating can be applied after the initial MICR printing step and fusing step, and before any secondary MICR imprinting has taken place. In embodiments, the coating is applied at a time of from about 50 milliseconds to about 120 seconds, or from about 1 to about 100 seconds after the MICR and non-MICR printing and fusing steps, but before any secondary MICR imprinting. Drying can be accomplished by use of ambient air and minimal heat, for example, heating to from about 1 to about 90° C., or from about 25 to about 45° C., or from about 30 to about 38° C.

Suitable check coatings herein include aqueous coatings. The aqueous coatings can comprise polymers such as styrenes, acrylics, styrene/acrylates, and mixtures thereof. A specific example is an acrylic copolymer aqueous solution, such as RHOPLEX HA-12, RHOPLEX 1-2074 (available from Rohm & Haas), and mixtures thereof. The polymer is present in the coating in an amount of from about 10 to about 90 weight percent, or from about 20 to about 65 weight percent.

Other ingredients of the coating include water, and neutralizing agents such as sodium hydroxide, amino alcohols, or the like, or mixtures thereof. Water is present in said coating in an amount of from about 40 to about 60 percent by weight. A neutralizing agent is present in an amount of from about 1 to about 5 percent, or from about 2 to about 3 percent by weight. Neutralizing agents are substances capable of raising the pH of a coating system to above 7, to allow for latex stability.

Ingredients also include surfactants such as Surfynol 504 (from Air Products), which includes a mixture of butanedioic acid, 1,4-bis(2-ethylhexyl) ester, sodium salt; NOVEC FC4432 (from 3M), which includes perfluorobutane sulfonates; and the like surfactants, and mixtures thereof. The surfactant is present in the coating in an amount of from about 0.1 to about 5 percent, or from about 0.5 to about 1 percent by weight. A surfactant is a surface active agent that accumulates at the interface between 2 liquids and modifies their surface properties.

Other ingredients of the coating include viscosity modifiers such as alkali-swellable crosslinked acrylic thickeners and associative thickeners. The viscosity modifier is present in the coating in an amount of from about 1 to about 10 percent, or from about 1 to about 5 percent by weight. A viscosity modifier is any compound able to increase the viscosity of the coating mixture through physical means.

Ingredients of the coating may also include waxes such as polyethylene or polypropylene waxes. Specific examples of suitable waxes include polyethylene waxes such as JONWAX 26 (polyethylene wax from Johnson Polymer/BASF and having a melting point of about 130° C., particle size of 50-100 nm, a loading of about 26% solids, and a pH of about 9.8). The wax is present in the coating in an amount of from about 1 to about 7 weight percent, or from about 2 to about 5 weight percent.

Ingredients of the coating may also include coalescing aids, polyglycol ethers like Butyl Carbitol and Dowanol DPnB (from Dow), and the like.

Ingredients also include defoamers such as BYK-028 (mixture of polymers and polysiloxanes) available from BYK Chemie, and mixtures of polymers and polyalkylsiloxanes, such as polydimethylsiloxane, polyethylsiloxanes, and the like. The defoamer is present in an amount of from about 0.01 to about 5 percent, or from about 0.1 to about 1 percent. A defoamer is a material used in the manufacture of a coating to reduce the foaming either in the processing step or during application.

The coating has a viscosity range of from about 100 to about 1,000 centipoise, or from about 120 to about 600 centipoise, and a surface tension of from about 10 to about 50, or from about 22 to about 30 dynes/cm.

The coating can be applied to the developed and fused check by known methods including roll coaters, offset gravure, gravure and reverse roll coating. In embodiments, the developed and fused check is coated on a two or three roll coating system, such as an Euclid Coating System lab coater (available from Euclid Coating Systems). The coating can be accomplished at a speed of from about 10 to about 100, or from about 30 to about 40 meters per minute. The coating can be applied to a thickness of from about 1 to about 10, or from about 1 to about 5 microns wet, or from about 0.5 to about 5, or from about 1.5 to about 2 microns dry. The check can then be dried using known methods including air drying, ultraviolet drying, heat drying, and the like. In embodiments, the coated check is placed on a belt of an Fusion UV System at a speed of from about 50 to about 200, or from about 75 to about 100 feet per minute, and allowed to dry under the heat generated by the UV lamp (heated at from about 10 to about 50, or from about 30 to about 50° C.). The coating provides sufficient wetting to allow for a uniform coating over oil covered, fused toner checks.

After the coating is placed on the check and dried, any secondary MICR imprinting may take place. Any known encoder can be used to supply the MICR encoding. For example, an NCR 7766-1000 encoder, available from NCR Corporation, using magnetic thermal transfer ribbon, which places the ink from the ribbon onto the dried coating.

Toners useful in MICR printing include mono-component and dual-component toners. Toners for MICR include those having a binder and at least one magnetic material. Optionally, the toner may include a surface treatment such as a charge control agent, or flowability improving agents, a release agent such as a wax, colorants and other additives.

The following Examples are intended to illustrate and not limit the scope herein. Parts and percentages are by weight unless otherwise indicated.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

EXAMPLES

Example 1

Preparation of Coating Formulation

RHOPLEX HA-12 and RHOPLEX I-2074 were blended together with medium shear (500 RPM) for approximately thirty minutes. The surfactants (SURFYNOL 504 and NOVEC FC4432, pre-blended in a 90/10 ratio) were added to the latex emulsions and allowed to mix for an additional thirty minutes. Next the water and defoamer, BYK-028, were added with stirring and mixed for thirty minutes. After the allotted time, a wax (JONWAX 26) was added with higher shear (700 RPM), and allowed to mix for thirty minutes. After sufficient mixing, ACRYSOL ASE-60 was added to the formulation and allowed to blend for about thirty minutes. At the allotted time, a pH meter was inserted into the mixture in order to monitor the pH of the coating. This is necessary as ACRSYOL ASE-60 is a hydrophically modified alkali swellable thickener (viscosity modifier) and is heavily pH dependent. The sodium hydroxide was added in a drop-wise fashion and the pH was allowed to stabilize between additions. The final pH was adjusted to approximately 8.5 to allow for latex stability and to let the modifier act to its fullest ability. After mixing for about thirty minutes, the final addition was butyl carbitol, added with medium high mixing (700 RPM). The coating was then measured for viscosity (337 centipoise) and surface tension (24 dynes/cm). The coating formulation is shown in Table 1 below.

TABLE 1

| Formulation Components | | |
|---|---|---|
| Component | Chemical Composition | Amount (wt %) |
| Rohm & Haas RHOPLEX HA-12 | Proprietary Acrylic Emulsion | 64.9 |
| Rohm & Haas RHOPLEX I-2074 | Proprietary Acrylic Emulsion | 22.0 |
| Water | Water | 0.5 |
| Neutralizing Agent | Sodium Hydroxide (50% Solution) | 2.7 |
| Air Products SURFYNOL 504/ 3M NOVEC FC 4432 | AP 504: Butanedioic acid, 1,4-Bis(2-ethylhexyl) ester, Sodium Salt<br>FC4432: Perfluorobutane sulfonate | 0.8 |
| Rohm & Haas ACRYSOL ASE-60 | Proprietary alkali swellable, crosslinked, acrylic thickener (50% water solution) | 3.6 |
| JONWAX 26 | Proprietary polyethylene wax emulsion | 2.5 |
| Butyl CARBITOL | Diethylene Glycol Monobutyl Ether | 2.5 |
| BYK-028 | Proprietary mix of polymers and polysiloxanes | 0.5 |

Example 2

Preparation of Check

Check stock (4024 DP, 24#, green perforated letter check) was purchased from Xerox Corporation as a regular part. This check stock was run through a Xerox internal fusing system to coat the paper stock with a representative amount of oil at about 8 microliters of oil per copy. At this point, the check stock was treated with an aqueous coating as above, by feeding the check through a Euclid Coating System lab coater at a speed of about 30 meters/minute. The 140 lines per inch roll in the coater resulted in a coating thickness of approximately 5 microns wet or about 1.5 to about 2 microns dry. The check was then placed on the belt of a Fusion UV Systems at a speed of approximately 100 feet/minute and allowed to dry under the heat generated by the UV lamp (38° C.). Under these conditions, the above formulation provided sufficient wetting to allow for a uniform coating over oil coated, fused-toner checks.

Example 3

MICR Encoding of Toner-Developed, Fused and Coated Check

Once the aqueous coating has been dried, the secondary imprinting takes place. This is done using an NCR 7766-1000 encoder using magnetic thermal transfer ribbon (MTTR) which places the ink (secondary encoding) on the dried coating. After this, the completely finished check was tested by measuring the magnetic signal strength of the encoding by running the check through a GTX Qualifier (check reader). Generally speaking, a check which does not contain any oil (mercapto or otherwise) will produce signal strength of approximately 98%±2%. However, when covered with an 0.09% amino functionalized fuser oil, the signal strength decreases to approximately 56%±2%. The current standard indicating a potentially acceptable solution is a signal strength of greater than 80%. When the above printing, fusing, coating and encoding was carried out using the stated aqueous coating, the magnetic signal strength was measured to be approximately 98% (essentially the same as a blank check with no fuser oil) when the oil rate is between 1 to about 5 microliters/copy. This high signal strength should, in turn, lead to a reader reject rate, which is much lower than currently measured 30%.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process of magnetic ink character recognition (MICR) and non-MICR electrostatic magnetic imaging of two independent electrostatic latent images comprising:

(a) forming a first electrostatic latent image in a MICR printing apparatus;

(b) developing the first electrostatic latent image by contacting the first electrostatic latent image with a MICR toner to produce a developed MICR toner image;

(c) transferring the developed MICR toner image onto a first surface of a check;

(d) forming a second electrostatic latent image in a non-MICR printing apparatus;

(e) developing the second electrostatic latent image by contacting the second electrostatic latent image with a non-MICR toner to produce a developed non-MICR image;

(f) transferring said non-MICR toner image to the first surface of said check;

(g) fusing said MICR toner image and said non-MICR toner image to the first surface of the check, wherein a fuser oil is supplied to the check during fusing;

(h) sealing the fuser oil between the first surface of the check and a film layer formed from an aqueous coating comprising a polymer and a surfactant, wherein the first surface of the check has fused developed MICR toner image and non-MICR toner image.

2. The process in accordance with claim 1, wherein said polymer is an acrylic polymer blend.

3. The process in accordance with claim 1, wherein said polymer is present in said coating in an amount of from about 10 to about 90 weight percent by weight of total solids.

4. The process in accordance with claim 1, wherein said surfactant comprises fluorosurfactants, butanedioic acid, and a sodium salt of 1,4-bis(2-ethylhexyl) ester.

5. The process in accordance with claim 1, wherein said coating is of a wet thickness of from about 1 to about 10 microns.

6. The process in accordance with claim 1, wherein after (h), the coating is dried to a dry thickness of from about 1 to about 5 microns.

7. The process in accordance with claim 1, wherein said coating further comprises a wax selected from the group consisting of polyethylenes, polypropylenes, and mixtures thereof.

8. The process in accordance with claim 1, wherein said coating further comprises a neutralizing agent.

9. The process in accordance with claim 8, wherein said neutralizing agent is selected from the group consisting of sodium hydroxide and amino alcohol.

10. The process in accordance with claim 1, wherein said coating further comprises a defoamer.

11. The process in accordance with claim 10, wherein said defoamer comprises a polyalkylsiloxane.

12. The process in accordance with claim 1, wherein said coating further comprises a thickener.

13. The process in accordance with claim 1, wherein said coating has a viscosity of from about 100 to about 1,000 centipoise.

14. The process in accordance with claim 13, wherein said viscosity is from about 120 to about 600 centipoise.

15. The process in accordance with claim 1, wherein said coating has a surface tension of from about 10 to about 50 dynes/cm.

16. The process in accordance with claim 15, wherein said surface tension is from about 22 to about 30 dynes/cm.

17. The process in accordance with claim 1, wherein said non-MICR toner is a color toner.

18. The process in accordance with claim 1, wherein said fuser oil is selected from the group consisting of nonfunctional oils, mercapto functional fuser oils, amino functional fuser oils, and mixtures thereof.

19. The process in accordance with claim 1, wherein said coating is applied at a time of from about 50 milliseconds to about 120 seconds after the MICR and non-MICR fusing.

20. The process of claim 1, further comprising:

said polymer in the aqueous coating is an acrylic polymer blend and is present in said coating in an amount of from about 10 to about 90 weight percent by weight of total solids;

said surfactant comprises fluorosurfactants, butanedioic acid, and a sodium salt of 1,4-bis(2-ethylhexyl) ester;

said non-MICR toner is a color toner;

said fuser oil is an amino functional fuser oil; and said coating:

is of a wet thickness of from about 1 to about 10 microns;

further comprises a wax selected from the group consisting of polyethylenes, polypropylenes, and mixtures thereof;

further comprises a neutralizing agent selected from the group consisting of sodium hydroxide and amino alcohol;

further comprises a defoamer comprising a polyalkylsioxane;

further comprises a viscosity modifier;

has a viscosity of from about 100 to about 1,000 centipoise;

has a surface tension of from about 10 to about 50 dynes/cm;

is applied at a time of from about 50 milliseconds to about 120 milliseconds after the MIRC and non-MIRC fusing; and after (h), is dried to a dry thickness of from about 1 to about 5 microns.

21. A process of magnetic ink character recognition (MICR) and non-MICR electrostatic magnetic imaging of two independent electrostatic latent images comprising:

(a) forming a first electrostatic latent image in a MICR printing apparatus;

(b) developing the first electrostatic latent image by contacting the first electrostatic latent image with a MICR toner to produce a developed MICR toner image;

(c) transferring the developed MICR toner image onto a first surface of a check;

(d) forming a second electrostatic latent image in a non-MICR printing apparatus;

(e) developing the second electrostatic latent image by contacting the second electrostatic latent image with a non-MICR toner to produce a developed non-MICR image;

(f) transferring said developed non-MICR toner image to the first surface of said check;

(g) fusing said MICR toner image and said non-MICR toner image to the first surface of the check, wherein a fuser oil is supplied to the check during fusing, and wherein said fuser oil is selected from the group consisting of nonfunctional fuser oils, amino functional fuser oils, mercapto functional fuser oils, and mixtures thereof;

(h) sealing the fuser oil between the first surface of the check and a film layer formed from an aqueous coating comprising an acrylate polymer blend and a surfactant, wherein the first surface of the check has fused developed MICR toner image and non-MICR toner image.

22. A process of magnetic ink character recognition (MICR) and non-MICR electrostatic magnetic imaging of two independent electrostatic latent images comprising:

(a) forming a first electrostatic latent image in a MICR printing apparatus;

(b) developing the first electrostatic latent image by contacting the first electrostatic latent image with a MICR toner to produce a developed MICR toner image;

(c) transferring the developed MICR toner image onto a first surface of a check;

(d) forming a second electrostatic latent image in a non-MICR printing apparatus;

(e) developing the second electrostatic latent image by contacting the second electrostatic latent image with a non-MICR toner to produce a developed non-MICR image;

(f) transferring said developed non-MICR toner image to the first surface of said check;

(g) fusing said MICR toner image and said non-MICR toner image to the first surface of the check, wherein a fuser oil is supplied to the check during fusing;

(h) sealing the fuser oil between the first surface of the check and a film layer formed from an aqueous coating comprising an acrylic polymer blend, a surfactant, a thickener, a wax, an optional defoamer, and a neutralizing agent, wherein the first surface of the check has fused developed MICR toner image and non-MICR toner image.

* * * * *